United States Patent [19]

Oetiker

[11] Patent Number: 5,001,816
[45] Date of Patent: Mar. 26, 1991

[54] METHOD FOR CONNECTING TWO PARTS ALONG ABUTTING EDGES AND CONNECTION OBTAINED THEREBY

[75] Inventor: Hans Oetiker, Horgen, Switzerland

[73] Assignee: Hans Oetiker AG Maschinen- und Apparatefabrik, Horgen, Switzerland

[21] Appl. No.: 409,689

[22] Filed: Sep. 20, 1989

[30] Foreign Application Priority Data

Apr. 4, 1989 [CH] Switzerland .......................... 1228/89

[51] Int. Cl.5 .............................................. B65D 63/02
[52] U.S. Cl. .................................. 24/20 EE; 24/20 R; 24/20 CW; 24/616
[58] Field of Search ............ 24/20 R, 20 EE, 20 CW, 24/20 TT, 19, 23 R, 31 R, 31 F, 644, 702, 265 WS, 616, 615, 580, 71 J, 588

[56] References Cited

U.S. PATENT DOCUMENTS

| Re. 25,769 | 4/1965 | Thurston et al. ............... 24/20 CW |
| 410,447 | 9/1889 | Rich .................... 24/20 EE |
| 1,421,388 | 7/1922 | Bippart ..................... 24/616 |
| 1,440,068 | 12/1922 | Ellin ........................... 24/616 |
| 1,599,016 | 9/1926 | Johnson et al. ....................... 24/616 |
| 2,646,940 | 7/1953 | Volz .................... 24/20 EE |
| 3,947,932 | 4/1976 | Flynn ..................................... 24/616 |
| 4,282,634 | 8/1981 | Krauss .................................... 24/323 |
| 4,539,736 | 9/1985 | Yokosuka ............................ 24/702 |
| 4,640,536 | 2/1987 | Printiss, Sr. et al. ................. 24/279 |
| 4,679,282 | 7/1987 | Feng ..................................... 24/615 |
| 4,813,108 | 3/1989 | Geldwerth ........................... 24/616 |

FOREIGN PATENT DOCUMENTS 869583 1/1953 Fed. Rep. of Germany ... 24/20 CW

Primary Examiner—Victor N. Sakran
Attorney, Agent, or Firm—Paul M. Craig, Jr.

[57] ABSTRACT

For the connection of two edges of areal parts which extend at least along one common section essentially parallel to one another, at least one retaining element is arranged at the one edge which form-lockingly engages from behind, as viewed in the edge direction, in a recess in the other edge. At least one projection arranged laterally offset at the one edge in relation to the retaining element in the direction of the engagement from behind, abuts form-lockingly at the part with the recess essentially in the edge direction. For the connection of the terminal edges of open ends of a ring-shaped clamping band, analogously a retaining tongue is provided, preferably in the center of the one edge with lugs projecting on both sides from the tongue which form-lockingly engages from behind in an essentially congruent recess in the other edge also arranged essentially centrally. One projection each is arranged in the one edge to both sides of the tongue, preferably arranged at the end of the one edge, whereby each projection form-lockingly abuts at the band-like part having the recess essentially parallel to the edge direction each in the direction toward the recess.

23 Claims, 2 Drawing Sheets

METHOD FOR CONNECTING TWO PARTS ALONG ABUTTING EDGES AND CONNECTION OBTAINED THEREBY

BACKGROUND AND SUMMARY OF THE INVENTION

The present invention relates to a method for securely joining two parts which extend at least essentially parallel to one another along a common section, and more particularly for fixedly joining the mutually facing edges of a clamping or compression ring as well as to the product made with such method.

For clamping fast tubularly shaped elements on a corresponding peripheral area of a cylindrical formed part such as, for example, of a shaft or of a further tubular member, so-called clamping rings are used in a known manner.

The use of clamping rings with so-called ears, which, as such, has proved very successful in practice, is not suited under certain conditions, especially, for example, when space conditions do not permit any projecting ears.

In those cases, so-called clamping or compression rings have been used, which, for purposes of clamping, are either externally shrunk or pressed together over the connection or which press the two tubularly shaped members against one another by expansion of the cylindrically shaped formed part.

Such clamps or compression rings are manufactured in that ring-like segments are sawed off, punched off or cut off from pipes having the required diameter. However, this type of manufacture has proved disadvantageous, and more particularly because (a) the newly made pipes have to be deburred along their outer longitudinal sides of the ring which requires a further operating step, (b) only stainless materials can be used, for example, no galvanized pipes, because the rings are damaged along the longitudinal sides, i.e., the galvanization is missing and because (c) only one ring size can be made with one pipe diameter.

A further possibility consists in bending up so-called washers whereby large forces have to be applied for this operation and additionally large internal stresses are present in the ring part. Also, rings with any desired diameter cannot be made with a certain size of a washer.

A further possibility would consist in the manufacture of a ring from a corresponding band-like part which had been cut-off from an endless band, by a ring-shaped bending of the cut-off part. However, it has been found that the connection of the two end portions of the band represent a weak point and that this connection does not withstand in particular loads in tension and compression.

It is therefore an object of the present invention to provide an arrangement for the connection of such mutually facing terminal band edges for the manufacture of a ring, in particular, and an arrangement for the connection of two edges in general which can be stressed in particular in tension and compression.

The underlying problems are solved according to the present invention by at least one retaining element at one edge which form-lockingly engages from behind, as viewed in the edge direction, in a recess provided in the other edge, and by at least one projection at the one edge laterally offset with respect to the element, which abuts form-lockingly essentially in the edge direction at the part with the recess.

The present invention proposes an arrangement for connecting two edges at flat areal parts extending essentially parallel to one another at least along a common section, which includes at least one retaining element at one edge that form-lockingly engages from behind, as viewed in the edge direction, in a recess provided in the other edge, and which further includes at least one projection at the one edge laterally offset with respect to the element, as viewed in the transverse direction in which the retaining element engages the recess from behind, whereby the projection(s) form-lockingly abuts or abut at the part with the recess essentially in the edge direction.

It is further proposed according to a modification of the present invention that the retaining element engages the recess from behind, as viewed in the edge direction, on both sides thereof and that correspondingly on both sides of the element one projection each laterally offset is arranged at the one edge which form-lockingly abuts in the edge direction at the part with the recess, as viewed in the direction toward the element.

Especially during the connection of two edges along a relatively short section, it is proposed according to this invention that the retaining element engages the recess from behind essentially in the center of the common section and that the projection or the projections is or are arranged essentially in the area or areas of an end or of the ends of the section.

For an arrangement for connecting two band-like longitudinally extending parts along terminal edges arranged essentially transversely to the band direction, whereby the band widths of the parts are preferably nearly equal at least within the area of the terminal edges, a retaining element is proposed according to the present invention at the one edge which form-lockingly engages from behind, as viewed in the edge direction, in a recess having a shape essentially congruent or complementary to the element and at least one projection at the one edge is proposed laterally offset with respect to the element, as viewed in the direction of the engagement from behind, which form-lockingly abuts at the part with the recess essentially in the edge direction.

In a further modified embodiment, it is proposed according to the present invention to arrange a retaining tongue essentially in the center of the one edge having lugs or lobes protruding on both sides of the tongue essentially parallel to the edge direction, which form-lockingly engages from behind an essentially congruent recess in the other edge also arranged essentially centrally, and to further arrange one projection each laterally offset on both sides of the tongue in the one edge, preferably end-face at the one edge, whereby each projection form-lockingly abuts at the band-like part with the recess essentially parallel to the edge direction each in a direction toward the recess.

The connection of relatively narrow band-like parts along their terminal edges is also possible by means of this modification.

However, if the two parts involve plates which are connected along a longitudinally extending common section, then the connection preferably includes two retaining elements at the one edge, whereby preferably one retaining element each is arranged in one-half of the common section. Analogous to the above-described embodiments, the at least two retaining elements engage form-lockingly from behind, as viewed in the edge direction in corresponding recesses provided in the other edge, and at least one projection each is arranged at the one edge laterally offset to the outermost element in the direction toward the end of the common section which form-lockingly abuts at the part with the recesses essentially in the edge direction against the respective outermost recess.

In order to securely fix the above-described connections, it is further proposed in accordance with the present invention that the connection includes at least one punching, rivet-like cold deformation and/or spot-welded place along the common section of the edges, of the retaining element and/or of the projection.

The described arrangements for the connection in accordance with the present invention are suited in particular for the manufacture of clamps consisting of at least one open clamping band with terminal edges arranged at its ends transversely to the band direction.

Preferably such a clamp includes a one-piece clamping band whereby the two end-face terminal edges are connected with each other by means of an arrangement according to the present invention.

Such a clamp is suited in particular for the manufacture of a pipe clamp or of a compression ring.

Furthermore, a method for the connection of two edges of flat parts is proposed according to the present invention which extend at least essentially parallel to one another at least along a common section.

According to this method, at least one retaining element is provided at one edge which is introduced form-lockingly engaging from behind in the edge direction in a corresponding recess provided in the other edge in order to prevent a pulling out of the element out of the recess and therewith to hold the parts at one another. In order to prevent that the portion engaged from behind in the part provided with the recess is bent-out to open up the recess, at least one projection is arranged at the one edge laterally offset in the direction of the engagement from behind with respect to the element, which form-lockingly abuts essentially in the edge direction at the part with the recess in such a manner as to counteract the force component acting away from the recess essentially in the edge direction and resulting during compression and/or tensional load of the connection by reason of the engagement from behind of the recess by the element. A bending out of the aforementioned portions which are engaged from behind is effectively prevented thereby.

According to a preferred method for the connection of two band-like, longitudinally extending parts along terminal edges arranged essentially transversely to the band direction, in which the band width of the parts are preferably nearly equal at least within the area of the terminal edges, it is proposed according to the present invention that a retaining tongue be arranged essentially in the center of the one edge which includes essentially parallel to the edge direction on both sides thereof, one projecting lug or lobe each, and in that the tongue is introduced form-lockingly engaging from behind in an essentially congruent recess arranged also essentially in the center in the other edge. One projection each is arranged in the one edge laterally offset on both sides of the tongue which form-lockingly abuts at the respective band-like part having the recess in the direction toward the recess and essentially parallel to the edge direction. The lateral bending out of the two portions of the band-like part having the recess which are disposed laterally of the tongue and are engaged from behind, is effectively counteracted by these two projections whereby the thus-produced connection can be stressed in tension and compression.

In order to further strengthen or fix the connection, the edges are punched, cold-deformed rivet-like or spot-welded together at least at one place of the common section, of the retaining tongue and/or of the projection.

The described methods according to the present invention are suited in particular for the connection of one or several band-like parts for the manufacture of a clamp or of a clamping ring.

With the use of a clamping or compression ring made in such a manner, a method for the connection of a cylindrical formed part or of a tubular part with at least one further tubular element or with a bellows is proposed, in which the further tubular element or the bellows is slipped or placed over a peripheral area of the formed part or of the one tubular member and subsequently a clamp or compression ring according to the present invention is slipped or placed over the further tubular element or bellows in the emplaced or slipped-over area. Finally, either the clamping ring is shrunk or compressed by means of suitable tools or the one formed part or the one tubular member is radially outwardly expanded in the peripheral area.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein.

DETAILED DESCRIPTION OF THE DRAWINGS

Figure 1:
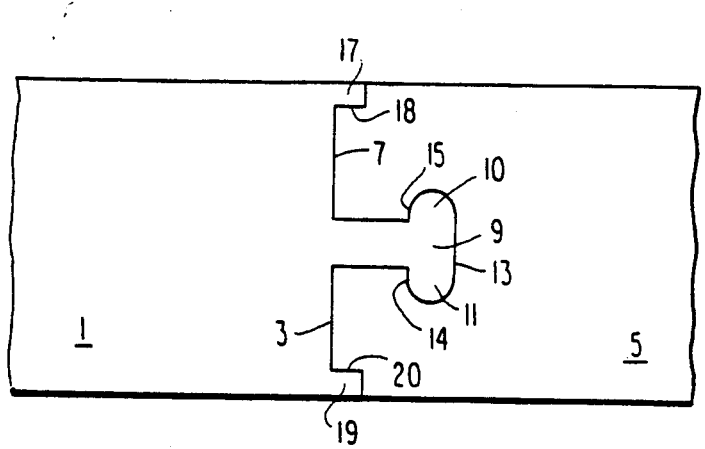
FIG. 1 is a partial plan view on a first embodiment of an arrangement for the connection of two areal parts in accordance with the present invention.
Figure 2:
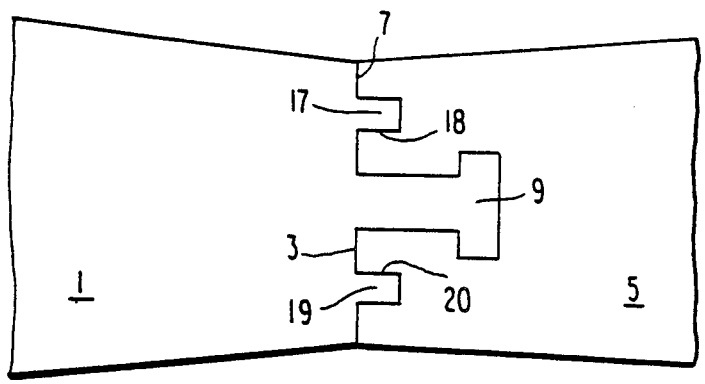
FIG. 2 is a partial plan view on a modified embodiment of a connection in accordance with the present invention.
Figure 3:
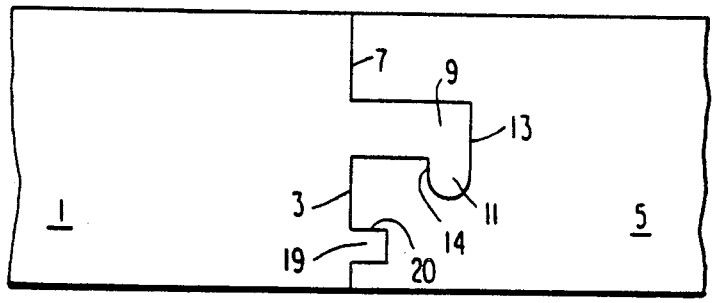
FIG. 3 is a partial plan view on a still further modified embodiment of a connection in accordance with the present invention.

Referring now to the drawing wherein like reference numerals are used to designate like parts in the various views, FIGS. 1 to 3 illustrate different possible modifications of a connection in accordance with the present invention. The connections are illustrated in top plan view on the areal parts, respectively, from above perpendicularly onto the terminal edges to be connected.

Plate-like parts 1 and 5 are connected with each other along their common edges 3 and 7, respectively. These plate-like parts 1 and 5 may be plates, band-like parts, relatively thin-walled rods, etc. A retaining element or retaining tongue 9 is arranged at the one edge 3 which includes two laterally projecting lug-like elements. According to FIGS. 1 and 2, the tongue 9 includes two such lugs 10 and 11 whereas in FIG. 3 only one projecting lug 11 is provided. The tongues 9 engage in corresponding congruent recesses 13 in the part 5, i.e., in a recess 13 of complementary shape. The tongue 9 thereby engages the recess 13 from behind, as viewed in the edge direction, along the two portions 14 and 15 by means of the two lugs 10 and 11.

If the connection according to FIGS. 1 and 2 is now stressed in tension or compression, there exists the tendency of the areas of the areal part 5 which are arranged behind the portions 14 and 15, to move laterally away from the tongue 9, as a result of which the tongue 9 might be pulled out or pushed out of the recess 13. In order to counteract this tendency of a lateral bending-out of these two areas, the two projections 17 and 19 are now provided at the one edge 3. These two projections 17 and 19 abut at the portions 18 and 20 of the areal part 5 and thus counteract any lateral bending-out of the two areas to the rear of the portions 18 and 20, respectively, to the rear of the portions 14 and 15. Owing to this arrangement of the two projections 17 and 19, the connection of the two areal parts 1 and 5 along the edges 3 and 7 is effectively secured or fixed against tension or compression. The two projections 17 and 19 can thereby be arranged either end-face along the edge 3 or also between the tongue 9 and the ends of the edge 3.

In FIG. 3 the tongue 9 includes only one lug 11 which correspondingly engages the recess 13 from behind along the portion 14. In this embodiment, analogously only one projection 19 is necessary which abuts at the areal part 5 at least along the portion 20. The projection 19 again serves to counteract a lateral bending-out of the area of the part 5 to the rear of the portions 14 and 20.

Figure 4:
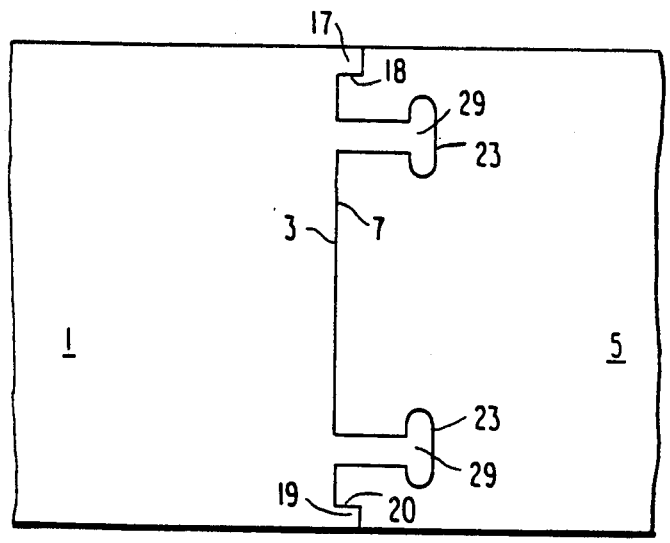
FIG. 4 is a plan view on another modified embodiment of a connection in accordance with the present invention of two large-area parts along one longitudinally extending common edge.

FIG. 4 now illustrates a connection between two plates 1 and 5 along a longitudinally extending common edge 3, 7, whereby two retaining elements or tongues 29 provided at the one edge 3 now engage in corresponding recesses 23. In the embodiment illustrated in FIG. 4 of a connection according to the present invention, no projections have to be arranged between the two adjacent tongues 29 because the tongues 29 mutually counteract against a lateral bending-out of the area of the part 5 disposed therebetween. By contrast, one projection 17 and 19 each is arranged end-face at the edge 3 which form-lockingly abuts at the portions 18, respectively, 20 of the part 5.

Figure 5:
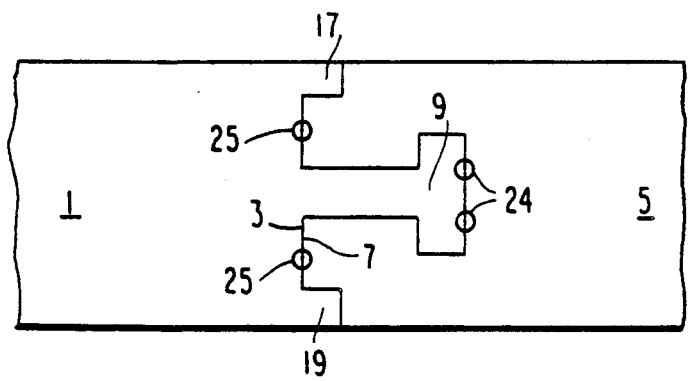
FIG. 5 is a plan view on a connection in accordance with the present invention provided with cold-deformed places.

For fixing any of the connections described above of two areal parts 1 and 5, it is proposed to provide so-called material displacement or punching places. This can be done by the use of conventional tools that produce, a rivet-like, cold-deformed mutual fixing of the two parts 1 and 5. In FIG. 5 the embodiment according to FIG. 1 is illustrated in principle, however, provided with two punching places 24 along the tongue 9 and with two further punching places 25 along the edge 3. The two band parts 1 and 5 are securely connected with each other, no longer disconnectible, by this punching operation.

The places 24 and 25 may also be soldered or brazed places, however, preferably only when the areal parts 1 and 5 consist of stainless material.

Figure 6:
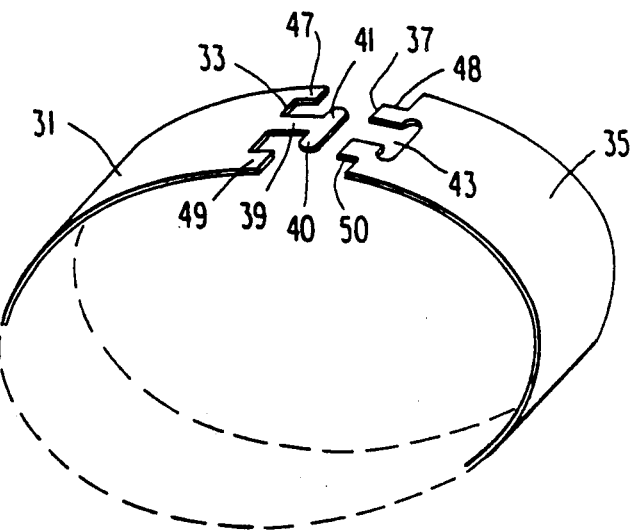
FIG. 6 is a perspective view of a clamp or clamping ring in accordance with the present invention in the non-connected open condition.

FIG. 6 now illustrates a clamp or clamping ring according to the present invention consisting of a clamping band with the two end portions 31 and 35. The clamping ring is illustrated in this figure in the open, non-connected condition. The clamping band can be made in one piece or of several parts with correspondingly one or several connections.

The two terminal edges 33 and 37 at the end portions 31 and 35 are provided with connecting elements analogously to the embodiment according to FIG. 1. A tongue 39 with lug portions 40 and 41 projecting on both sides is arranged at the edge 3. Additionally, projections 47 and 49 are provided at the edge 3. Correspondingly a recess 43 is provided at the edge 37 and portions 48 and 50 are provided along the sides, into which or at which the elements of the edge 33 are to be introduced, respectively, abutted.

Depending on the desired diameter of the clamping or compression ring, a corresponding band section can be cut off from an endless band. The elements are stamped or pressed out along the edge 33 and 37 correspondingly at the two end-face portions 31 and 35 of this band-like section. The clamping ring is now realized by guiding together the two edges 33 and 37 together with the connecting elements correspondingly formed thereon and by bending the band section into appropriate circular shape. For fixing the connection punching or cold-deformed places may be additionally provided as illustrated in FIG. 5.

Figure 7:
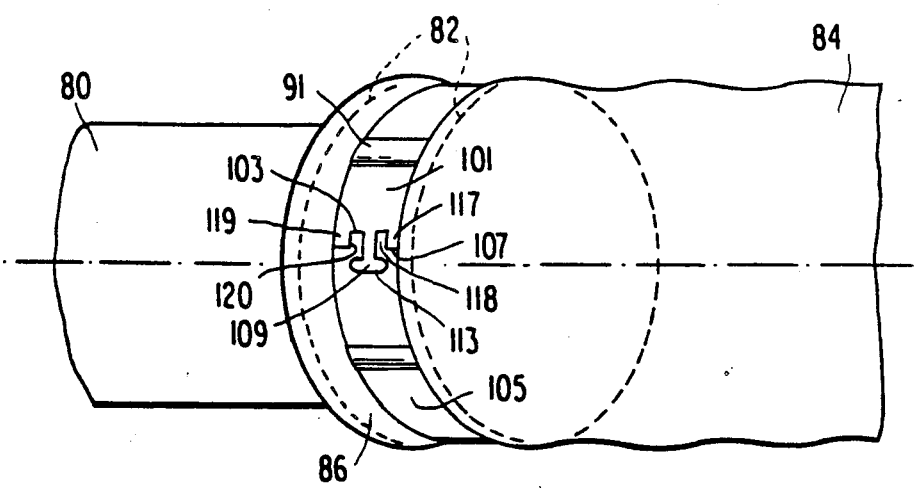
FIG. 7 is a connection of a shaft with a bellows-like tubular member with the use of a clamp, respectively, compression ring in accordance with the present invention.

In FIG. 7, a clamp or compression ring according to the present invention and made according to FIG. 6 is now illustrated in the connected closed condition by reference to a practical application.

A shaft 80 includes an end portion 82 having a larger diameter than the shaft 80. A bellows-like tubular member 84 is to be connected with the shaft 80 which is slipped over the area 82 with its end portion 86 in order to be securely connected with the shaft 80. Such a connection may occur, for example, in the automobile industry where wheel axles, drive shafts or universal joint shafts are protected by bellows or are surrounded by the same. Also in this case the bellows made from rubber or any other appropriate folded material is retained on a counter-part, for example, on the shaft.

After the bellows 84 is slipped with its portion 86 over the area 82, the clamping ring is now also slipped over the area 86. A tongue 109 engages again in a corresponding recess 113 and lateral projections 117 and 119 abut at the portions 118 and 120 of the band end 105. In order that the two band ends are fixedly connected with each other, this connection may include punching or rivet-like, cold-deformed places as illustrated in FIG. 5.

After arranging the clamping ring or compression ring over the slipped-over area 86, suitable tools such as clamping jaws (not shown) are arranged about the clamping ring and the ring is pressed over the area 86 by compression of these jaws. The diameter of the clamping ring is reduced by this compression operation, and compression zones 91 result in the clamping ring which represent thickened accumulations in the areas between the jaws and are caused by material flow during the compression. The bellows 84 is now securely connected with the shaft 80.

However, the connection can also take place in that in lieu of the compression, the inner area 82 is expanded radially outwardly whereby the clamping ring finally again clamps fast from the outside the bellows in the slipped-over area 86 on the inner area 82. However, the inner area 82 then preferably consists of an expandable material such as sheet material or thin-walled metal.

The method explained by reference to FIG. 7 can, of course, be used for the connection of any desired shaft-like and tubularly shaped elements by means of a clamping or compression ring.

The connection of areal parts and band ends of clamps and clamping rings described by reference to FIGS. 1 to 7 may be modified in any suitable manner. For example, the lateral portions of the retaining elements or the tongues which engage the corresponding recesses from behind, may be constructed in any suitable manner. These portions may be, for example, thread-like (spiral), may have several layers, etc. Also, the projections can be constructed in any suitable manner. They may be, for example, triangularly shaped, they may be formed by round tongues, etc. The use and applications of the connections in accordance with the present invention is also versatile, essential for the present invention is that at least on one side of the retaining element a projection be arranged, and more particularly on the side on which the retaining element engages the corresponding recess from behind.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An arrangement for the connection of two areal parts along two edges thereof which extend essentially parallel to one another at least along a common section, comprising retaining means projecting from one edge of one part in the direction toward and over the edge of the other part, said retaining means being operable to form-lockingly engage from behind, as viewed in the edge direction, in a recess means provided in the other part, and at least one projection means at the one part laterally offset with respect to the retaining means in the direction of the engagement from behind, which form-lockingly abuts at the other part with the recess means to constrain bending movement in the other part in the edge direction which would open the recess means in the presence of tensional forces in the two parts.

2. An arrangement according to claim 1, wherein the retaining means engages the recess means from behind on both sides, as viewed in the edge direction, and wherein at least two projection means are provided, one projection means each being arranged on a respective side of the retaining means laterally offset with respect thereto.

3. An arrangement according to claim 1, wherein the retaining means engages the recess means from behind essentially in the center of the common section, and wherein the projection means is arranged essentially in the area of an end of the section.

4. An arrangement according to claim 1, further comprising at least one fastening means along the common section of the edges of at least one of the retaining means and of the projection means.

5. A clamp according to claim 1, wherein the clamping band is in one piece and the two end-face terminal edges include said connection.

6. An arrangement according to claim 4, wherein said fastening means is formed by at least one of punching, cold-deformed material displacement and spot-welding.

7. A clamp consisting of at least one open clamping band with terminal edges arranged at its ends extending transversely to the band direction and with a connection arrangement according to claim 1.

8. A pipe clamp or compression ring with a clamp according to claim 7.

9. An arrangement for the connection of two band-like longitudinally extending parts along terminal edges arranged essentially transversely to the band direction, with the band width of the parts being nearly equal at least within the area of the terminal edges, comprising at least one retaining means at one part and extending from the edge thereof which form-lockingly engages rom behind, as viewed in the edge direction, in an essentially complementary recess means in the other part, and at least one projection means at the one edge laterally offset with respect to the retaining means in the transverse direction of the band-like parts which form-lockingly abuts in the edge direction at the part having the recess means to prevent opening of the complementary recess means in the presence of forces seeking to bend out those portions of the other part which at least partially define the recess means.

10. An arrangement according to claim 9, wherein the tongue-like retaining means is arranged essentially in the center of the one edge and includes lug means on both sides thereof which project essentially parallel to the edge direction, the tongue-like retaining means with its lug means form-lockingly engaging from behind an essentially congruent, also essentially centrally arranged recess means in the other edge, and wherein one projection means each laterally offset with respect to the tongue-like retaining means in the one edge is arranged at least near a respective lateral edge end, whereby each projection means form-lockingly abuts at the band-like part having the recess means essentially parallel to the edge direction and in a direction toward the recess means.

11. An arrangement according to claim 10, further comprising at least one fastening means along the common section of the edges of at least one of the retaining means and of the projection means.

12. An arrangement according to claim 11, wherein said fastening means is formed by at least one of punching, cold-deformed material displacement and spot-welding.

13. An arrangement for the connection of two plate-like parts with a longitudinally extending common section defined by the edges on the parts, comprising at least two retaining means at one edge, one each in one-half of the common section, which form-lockingly engage from behind, as viewed in the edge direction, in corresponding recess means in the other edge, and at least one projection means each in the one edge, laterally offset in relation to each outermost retaining means in the direction toward the end of the common section which form-lockingly abut at the part having the recess means essentially in the edge direction in the direction toward the respective recess means.

14. An arrangement according to claim 13, further comprising at least one punching, cold-deformed material displacement and/or spot-welded place along the common section of the edges of the retaining means and/or of the projection means.

15. A method for connecting two edges of areal parts which extend essentially parallel to one another at least along a common section, comprising the steps of providing at least one retaining element at one edge, introducing the retaining element in a corresponding recess in the other edge so as to engage form-lockingly from behind the recess, as viewed in the edge direction, in order to prevent a pulling out of the retaining element and to hold the two parts at one another, and providing at least one projection at the one edge laterally offset with respect to the retaining element in the direction of the engagement from behind which form-lockingly abuts at the part having the recess essentially in the edge direction in such a manner as to counteract force components acting essentially in the edge direction away from the recess and resulting during tensional and/or compression loads of the connection by reason of the engagement from behind of the recess by the retaining element.

16. A method for the connection according to claim 15, further comprising the step of fastening together the two parts at least at one place along the common section of the retaining tongue and of the projection for securely fixing the connection.

17. A method for the connection according to claim 16, wherein the step of fastening together the two parts includes one of punching, displacing cold-deformed material and spot-welding.

18. A method for the connection of two band-like longitudinally extending parts along terminal edges arranged essentially transversely to the band direction, comprising the steps of providing a retaining tongue essentially in the center of the one edge which includes one lug each on both sides thereof extending essentially parallel to the edge direction, introducing the tongue into an essentially congruent, also centrally arranged recess in the other edge so as to form-lockingly engage the same from behind, and providing in the one edge on both sides of the tongue laterally offset with respect thereto one projection each which form-lockingly abuts at the band-like part with the recess essentially parallel to the edge direction and in the direction toward the recess.

19. A method for the connection according to claim 18, further comprising the step of fastening together the two parts at least at one place along the common section of one of the retaining tongue and of the projection for securely fixing the connection.

20. A method for the connection according to claim 19, wherein the step of fastening together the two parts includes one of punching, displacing cold-deformed material and spot-welding.

21. A product made according to the method of claim 18, for the connection of at least one band-like part for the manufacture of a clamp-like ring.

22. An arrangement for the connection of two edges of areal parts which extend essentially parallel to one another at least along a common section, comprising retaining means at one edge which form-lockingly engages from behind, as viewed in the edge direction, in a recess means provided in the other edge, and at least one projection means at the one edge laterally offset with respect to the retaining means in the direction of the engagement from behind, which form-lockingly abuts in the edge direction at the part with the recess means, the retaining means engaging the recess means from behind on both sides, as viewed in the edge direction, and at least two projection means being provided, one projection means each being arranged on a respective side of the retaining means laterally offset with respect thereto.

23. An arrangement according to claim 22, wherein the retaining means engages the recess means from behind essentially in the center of the common section, and wherein the projection mans is arranged essentially in the area of an end of the section.

* * * * *